F. E. BARON.
HEAT CONDUCTING DEVICE FOR KETTLES, BOILERS, OR OTHER VESSELS.
APPLICATION FILED AUG. 1, 1916.
1,205,077.
Patented Nov. 14, 1916.
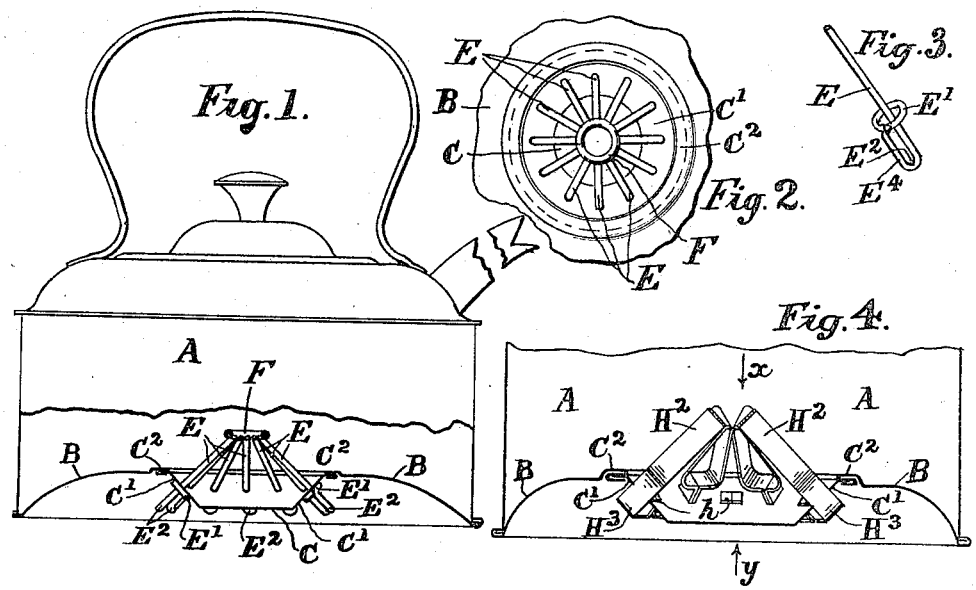
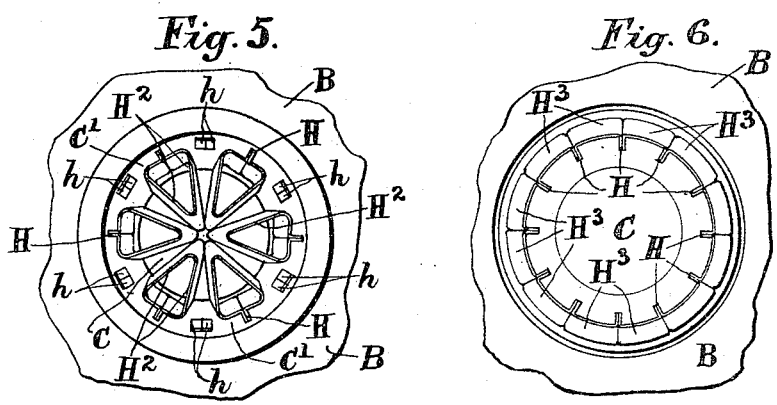
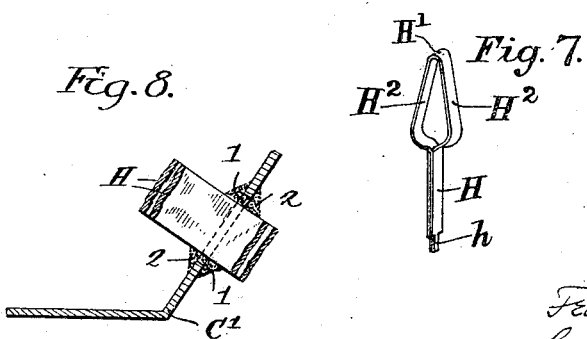
Inventor:
Francis Edward Baron
by Carl P. Goepel.
Attorney.

UNITED STATES PATENT OFFICE.

FRANCIS EDWARD BARON, OF HITCHIN, ENGLAND.

HEAT-CONDUCTING DEVICE FOR KETTLES, BOILERS, OR OTHER VESSELS.

1,205,077.   Specification of Letters Patent.   Patented Nov. 14, 1916.

Application filed August 1, 1916. Serial No. 112,501.

*To all whom it may concern:*

Be it known that I, FRANCIS EDWARD BARON, consulting engineer, a subject of the King of Great Britain, residing at 115 Windbush road, Hitchin, Hertfordshire, England, have invented certain new and useful Improvements in or Relating to Heat-Conducting Devices for Kettles, Boilers, or other Vessels, of which the following is a specification.

This invention is for improvements in or relating to heat-conducting devices for application to kettles, boilers or other vessels through which it is desired to transmit heat, and has for its object to provide means whereby the heat can be more readily transmitted through the wall of a container either to or from the contents of the containers; and this invention relates to kettles, boilers or other vessels through the walls of which it is desired to transmit heat of the kind having the wall thereof provided with internal and external projections which extend through the metal forming the wall of such kettle, boiler or other vessel. Now according to the present invention such internal and external projections are formed of a metal of good heat conductivity—such for example as copper—and the exterior portion of each said projection is bent or formed in such wise that the end thereof is brought into direct contact with the wall of the said kettle, boiler or other vessel (which I will hereinafter refer to as the "container") and is there fixedly secured in actual physical contact therewith.

In carrying this invention into practice the wall of the container is provided with a plurality of external and of internal projections whereby the superficial area in contact with the heating or cooling medium outside the vessel is increased and also the superficial area of the parts in contact with the contents of the vessel is increased. These projections are formed by metal pieces which extend through the wall of the container and project both inside and outside of the same. The metal of which the said pieces are made is one which is a better conductor of heat than that whereof the wall of the container is constructed, and each piece of metal where it passes through the wall of the container may advantageously be surrounded by a packing of material which is a less efficient conductor of heat than the pieces of metal, or even than the wall of the container in which the pieces of metal are fixed. Thus the heat conductors may take the form of a plurality of copper strips or copper wires soldered in holes in the wall of the container, the said holes being large enough for a filling of solder or other material of less conductivity than said strips around the shank portion of each strip or wire, whereby the shank portion of the strip or wire is prevented from coming into direct contact with the wall of the container and consequently the heat passing through said strips is not diverted into said wall. Where iron or steel is employed for the wall of the container this arrangement is found to give better results than is the case if the strips or wires are driven as a tight fit through holes in the wall and then soldered therein.

Conveniently the wall of the container may be provided with one or more external bosses at the point where the heat conductors are provided, and the heat-conductors may be made to radiate from the sides of these bosses.

According to one embodiment of the invention as applied to a kettle, the bottom of the kettle is concave on its underside and provided centrally thereof with a dependent saucer-shaped boss, which may be integral with the bottom or soldered thereto. In the latter case the bottom is provided with an opening which is closed by said boss. The sides of the boss are pierced with holes and copper strips or wires are pushed through these holes and soldered in place.

The ends of the strips or wires on the inside of the kettle are conveniently arranged in the form of a cone and may be soldered or otherwise attached to a connecting-ring at the top so that an open conical structure is provided (inside the kettle) which offers a good deal of area to the water within the kettle.

The exterior ends of the strips or wires (of copper or other suitable metal—for example silver—of good heat conductivity) are bent round into or formed in any desired concentrated form for example in the case of a copper wire a part of same may be given a spiral form and then the free end bent round so that each one provides a U-shaped end and the free end either with or without being passed back through the wall of the container is then laid flat or otherwise against the wall of the container or against the boss and suitably secured against (i. e. in actual contact with) the wall of the container e. g. soldered thereto at the same time as the wire is soldered in the wall or in the said boss; while in the case of a strip of copper or other suitable metal of good heat conductivity the same may be bent into a loop of triangular or other suitable form and the two end parts brought flatwise together and passed through an aperture (or boss or bush) in the wall of the container and the shank there secured by soldering or other suitable means so as to form a liquid-tight joint while the two ends exterior of the wall of the container are bent round in opposite directions so as to each form a loop and the extreme end is then secured to or through the wall of the container in a liquid-tight manner and in direct contact with said wall for example said ends may be passed back through apertures in the wall of the container and there secured in actual contact with said wall by solder or in any other suitable manner so as to form a liquid-tight joint.

It is found that a kettle provided with these heat conducting devices arranged and mounted as aforesaid boils more quickly than a similar kettle without the heat conductors when both kettles have been tested alternately on the same heating means.

In the accompanying drawings I have illustrated my invention as carried into practice in conjunction with an ordinary type of domestic kettle; Figures 1 to 3 illustrating one form and Figs. 4 to 8 another form of construction and arrangement and mounting of the heat-conducting devices in a kettle viz:—Fig. 1 is a side view in elevation of an ordinary form of tin kettle (or of suitable sheet metal) with part of the side of said kettle broken away to thereby show the heat conducting devices formed of copper wires arranged and mounted in the bottom of said kettle. Fig. 2, is a top plan view of the group of heat-conducting devices shown in Fig. 1. Fig. 3, is a view of one such wire heat-conducting device shown separately. Fig. 4, is a view in elevation of part of the body of a kettle with part of the side broken away showing heat-conducting devices of a somewhat different form arranged and mounted in the bottom of said kettle. Fig. 5, is an interior plan view of the group of heat-conducting devices shown in Fig. 4, looking in the direction of the arrow X Fig. 4. Fig. 6, is an exterior (underside) plan view of the bottom of the kettle looking in the direction of the arrow y Fig. 4. Fig. 7, is a view of one of the said heat-conducting devices shown in Figs. 4, to 6, before it is mounted in the bottom of the kettle. Fig. 8 represents a transverse section of a fragment of the wall of the kettle or other container taken on a line passing through one of the slots therein, a side elevation of a fragment of one of the heat distributers passed through said slot, and a section of a comparatively non-conductive packing between said parts.

Referring now more particularly to Figs. 1 to 3, A is the kettle body of any ordinary construction. B is raised bottom of said kettle. C is boss or circular flanged cup or dish with upwardly and outwardly sloping side wall or conical portion $C^1$ and flange $C^2$ which latter is soldered or otherwise secured (e. g. seamed) in a water-tight manner to the bottom B; or said boss C and conical wall $C^1$ may be formed integral out of a single metal sheet. E E are the heat-conducting devices each consisting of wire of copper (or other suitable metal) one end of which is bent into a circle $E^1$ (as shown more particularly at Fig. 3,) and the outer part (beyond the circle $E^1$) bent into a loop $E^2$ the circle $E^1$ toward the extreme outer end $E^4$ being brought into such position as to make contact against the conical wall $C^1$— or said end $E^4$ may be otherwise brought into direct contact with said wall $C^1$—and be there secured by soldering or otherwise. The upper part of these wires E (inside the kettle) are arranged in a cone and the inner end of the wires E thus arranged are each and all secured by soldering or otherwise to the small central ring F so as to brace and hold said wires E in correct position inside the kettle.

Referring now more particularly to Figs. 4 to 8:—In this arrangement each of the heat-conducting devices is formed of a flat strip H of copper (or other suitable metal) which midway of its length at $H^1$ is bent equally to form the loop $H^2$ (see Fig. 7). The slot 1 through which the shank of the strip H passes is large enough to permit of a packing of solder around said shank between it and the body of the vessel. This packing of solder is of less conductivity than the heat distributer H and preferably of the material of which the vessel is constructed, so that the heat passing through the distributer will not be diverted into the wall of the vessel. Moreover the packing strengthens the joint between the distributers and said wall. The two ends of this strip of copper H are laid flatwise and flush together and form the device shown in Fig. 7, and the said two ends H while thus laid flush together are passed through the wall of the container A which in the arrangement illustrated is provided with a dish C and conical wall $C^1$ and said two ends H (Fig. 7) passed through a slit or aperture in said conical wall $C^1$ and there secured by soldering or other suitable means and the said two ends H in the outside of said bottom are splayed and bent away from one another so as to each form a loop H³ on the exterior (underside) of the dish C of the bottom B of the kettle and then the end of the said exterior part H³ of each such strip or device H is secured so as to make direct contact with said end against either the outer surface of the bottom of the cup C as aforesaid or as illustrated said extreme outer end h is passed back through the bottom i. e. through another slit or aperture in the bottom or boss therein and then turned over and riveted as shown in Figs. 4. to 6 and soldered over to make liquid-tight closure or otherwise secured therein or thereto in accordance with this invention.

In a kettle or boiler or other vessel for raising the temperature of the contents, it is advantageous to so locate the parts of the heat-conducting devices which are exterior of the kettle, boiler or other vessel that the same will not come in contact with the stove or the support on which said vessel rests while the heat is being applied for example as shown the outer bottom edge of the kettle extends below the plane of the ring of heat-conducting devices.

In carrying the invention into practice it is advantageous that an equal area or preferably a greater area of the heat-conducting devices should be presented inside the kettle, boiler or other vessel and this proportion may vary as desired for example as illustrated the proportion inside and outside is about equal, but the proportion of area inside may be about two or three times greater than the area outside exposed to flame or I may arrange up to about five or six times more area (or even more) inside than outside such vessel.

Obviously the heat-conductor may be variously modified without departing from the spirit of this invention, for instance the boss or whole wall of the container to which the heat-conductors are applied may be of the same material as the heat-conducting strip or wires if desired.

It will be understood that the same device may be used as a cooling means, the external projections from the strips or wires being then used to radiate the heat conducted to them from the strips or wires within the container, or to conduct the heat to any cooling medium to which the outside of the container may be in contact.

What I claim is:—

1. A vessel of the character described provided with highly conductive metallic heat distributers which extend through the wall of said vessel and form interior and exterior projections, the joints between said wall and said distributers being closed by material of less conductivity than said distributers.

2. A vessel of the character described provided with heat distributers which extend through the wall of said vessel and form interior and exterior projections, said heat distributers being composed of strips of highly conductive metal, the external parts thereof being splayed and bent into loops, the ends of said splayed parts being returned through said wall and secured thereto in contact therewith.

3. A vessel of the character described provided with highly conductive metallic heat distributers which extend through the walls of said vessel and form interior and exterior projections, said vessel being provided with rests which extend below the plane of the exterior projections of said distributers.

4. A vessel of the character described provided with a concave bottom and with highly conductive metallic heat distributers extending therethrough and forming interior and exterior projections, said exterior projections terminating within the concavity of said bottom.

5. A vessel of the character described having a concave bottom, a dependent boss connected therewith and highly conductive metallic heat distributers which extend through the wall of said boss and form interior and exterior projections.

6. A heat distributer for a vessel of the character described consisting of a strip of highly conductive metal comprising a looped upper portion and a straight duplex shank portion adapted to pass through a slit in the wall of such vessel.

7. A heat distributer for a vessel of the character described consisting of a strip of highly conductive metal comprising a looped upper portion and a straight duplex shank portion adapted to pass through a slit in the wall of such vessel and having attaching tangs at its lower end.

8. A vessel of the character described having a concave bottom provided with an opening, a dish-shaped device secured to said bottom and closing said opening and highly conductive metallic heat distributers which extend through the wall of said dish-shaped device and form interior and exterior projections.

9. A vessel of the character described provided with highly conductive metallic heat distributers which extend through the wall of said vessel and form interior and exterior projections, said interior projections comprising a series of conically inclined loops.

10. A vessel of the character described provided with highly conductive metallic heat distributers which extend through the wall of said vessel and form interior and exterior projections, the interior projections being formed in a series of loops.

11. A vessel of the character described provided with highly conductive metallic heat distributers which extend through the wall of said vessel and form interior and exterior projections, both the exterior and interior projections being in the form of loops.

12. A vessel of the character described, provided with highly conductive metallic heat distributers which extend through the wall of said vessel and form interior and exterior projections, the exterior projections being formed in a series of loops, the ends of the exterior loops being passed back through said wall and bent into contact with the inner face thereof.

In witness whereof, I have hereunto set my hand, in the presence of two witnesses.

FRANCIS EDWARD BARON.

Witnesses:
W. HULSSIS,
A. Y. CORIGAN.

Copies of this patent may be obtained for five cents each, by addressing the "Commissioner of Patents, Washington, D. C."